United States Patent [19]

Manson et al.

[11] 4,400,806

[45] Aug. 23, 1983

[54] PICKUP ARM SUSPENSION FOR VIDEO DISC CARTRIDGE

[75] Inventors: Ernest T. Manson, Indianapolis; Byron K. Taylor, Carmel, both of Ind.

[73] Assignee: RCA Corporation, New York, N.Y.

[21] Appl. No.: 363,391

[22] Filed: Mar. 29, 1982

[51] Int. Cl.³ .......................... G11B 9/06; G11B 3/52
[52] U.S. Cl. .................................... 369/170; 369/126
[58] Field of Search ............... 369/170, 173, 293, 126, 369/151

[56] References Cited

U.S. PATENT DOCUMENTS

| | | | |
|---|---|---|---|
| 3,873,783 | 3/1975 | Leedom | 179/100.4 |
| 4,030,123 | 6/1977 | Taylor et al. | 358/128 |
| 4,030,124 | 6/1977 | Allen | 358/128 |
| 4,049,280 | 9/1977 | Leedom | 274/37 |
| 4,063,285 | 12/1977 | Nagaoka | 358/128 |
| 4,077,050 | 2/1978 | Dholakia | 358/128 |
| 4,124,217 | 11/1978 | Tajima | 274/37 |
| 4,170,783 | 10/1979 | Tajima | 358/128 |
| 4,183,059 | 1/1980 | Palmer | 358/128 |
| 4,256,311 | 3/1981 | Allen et al. | 369/170 |
| 4,258,233 | 3/1981 | Simshauser | 369/33 |
| 4,366,563 | 12/1982 | Riddle | 369/170 |
| 4,374,434 | 2/1983 | Hatin | 369/170 |

FOREIGN PATENT DOCUMENTS 2050037 12/1980 United Kingdom.

OTHER PUBLICATIONS

"Flylead for a Video Disc Stylus Cartridge", Ser. No. 118,240, filed 2-4-80, Taylor.

Primary Examiner—Steven L. Stephan
Attorney, Agent, or Firm—E. M. Whitacre; J. S. Tripoli; E. P. Herrmann

[57] ABSTRACT

A video disc signal pickup cartridge is described wherein the stylus arm is coupled to the cartridge body by a highly compliant relatively long, flat member suspended vertically from the top wall of the cartridge. The stylus arm is coupled to the member by passing one end of the arm through a tight fitting hole in the distal end of the member. The member is necked down near the hole to increase torsional compliance with respect to axial rotation of the stylus arm. The proximate end of the member has an expanded compliant region which is compressed for passage through a mounting hole in the cartridge body and allowed to re-expand to compressively retain the member in the hole.

11 Claims, 6 Drawing Figures

PICKUP ARM SUSPENSION FOR VIDEO DISC CARTRIDGE

This invention relates to a signal pickup enclosure assembly and more particularly to the pickup cartridge for a high density disc record playback apparatus, e.g., a capacitance video disc system.

A commercially available video disc system incorporates apparatus for recovering recorded signal from a disc record. The signal is recorded in extremely high density format as geometric variations in an information track on the disc record. The signal track density may be in the order of 10,000 tracks per inch and the pitch of the geometric variations may approach 50,000 per inch. The dimensions of the recorded information demand that: (a) the signal recovery transducer have similar dimensions, at least at the point it contacts the disc if signal crosstalk is to be avoided; (b) that some means be provided to constrain the transducer to follow the signal track; and (c) means are provided to insure uniform transducer-disc interaction, i.e., pressure, so that foreign material or disc warp do not interrupt signal recovery by lofting the transducer.

In this commercially available system, signal is recovered by creating relative velocity between the pickup transducer and the disc. To compensate for deviations in transducer-disc relative velocity, provision is made to translate the pickup transducer along the signal track, i.e., armstretching.

In the commercially available system the signal pickup transducer is supported in a cartridge to facilitate servicing or replacement. The pickup transducer is a dielectric stylus onto which a pickup electrode has been fabricated. The stylus electrode and geometric variations in the disc cooperate to produce a time varying capacitance in accordance with the recorded signal. The time varying capacitance is then converted in the player circuitry to an electrical manifestation of the recorded signal. The stylus is fixed to one end of a relatively long, lightweight stylus arm. The other end of the stylus arm is compliantly secured inside the cartridge enclosure with provision for the stylus to protrude therefrom to engage the disc. A leaf spring is connected between the one end of the stylus arm and the cartridge body to provide electrical connection to the stylus electrode and to provide the appropriate stylus-disc engaging pressure during record playback. U.S. Pat. No. 4,030,124 issued to Allen and U.S. Pat. No. 4,258,233 issued to Simshauser illustrate a signal pickup cartridge of the type currently supplied with the commercially available video disc players.

In the Allen cartridge, the proximate end of the stylus arm is attached to a compliant coupler about which the stylus arm may pivot in the lateral or side-to-side direction and in the vertical or disc engaging direction. The coupler in turn is secured to a diaphragm stretched between the sidewalls of the cartridge. The diaphragm permits limited longitudinal translation of the stylus arm and stylus for armstretching purposes. Secured to the diaphragm is a magnetic plate for removable connection to the armature of a solenoidal transducer which produces the requisite armstretching motion.

The Simshauser cartridge also includes a permanent magnet mounted near the distal end of the stylus arm. This magnet is disposed between a pair of electromagnetic coils fixed to the player and cooperates therewith to induce lateral or track-to-track stylus motion for the purpose of stylus tracking correction or special effects, e.g., fast scan, stop action, etc. Heretofore, it was presumed that in order to achieve accurate stylus positioning onto particular tracks in light of the aforementioned dimensions, the pivot point of the stylus arm should be fixed, at least in the lateral dimension. This presumption is evidenced by the method of mounting shown in the available art. For example, see U.S. Pat. Nos. 3,952,145; 4,049,280; 4,063,285; 4,077,050; 4,124,217; 4,170,783 and U.K. Patent Application No. 2,050,037 which illustrate that the proximate end of the stylus arm, i.e., the pivot point, is fixed in the lateral direction either by a stretched diaphragm type mounting structure or an armstretcher connector.

In order to reduce the cost of the system it is desirable to make the armstretcher integral with the cartridge. This may be accomplished in principle by securing a permanent magnet to the proximate end of the stylus arm and mounting a coil energized with armstretcher control signals proximate the magnet and arranged to produce forces colinear with the longitudinal axis of the stylus arm. U.S. Pat. No. 4,170,783 illustrates one such apparatus.

It has been found, however, that with the present commercially available stylus arm suspension it is not a trivial matter to simply fix a magnet to the stylus arm and couple a magnetic field thereto from a coil to produce longitudinal motion. The diaphragm is relatively resistant to motion so that a relatively large magnet is required. This adds to the mass of the stylus arm and dictates the use of a relatively large drive coil or relatively high amplitude coil exciting currents both of which are counterproductive to cost reduction. In order to produce longitudinal stylus translation with a relatively small coil and magnet it became necessary to design a suspension with higher compliance to longitudinal motion while retaining its pivotal characteristics.

Lateral translation of the stylus is performed by slowly twisting the stylus-stylus arm to offset their center of mass in the direction of desired translation and abruptly releasing the twisting force. The twisting is performed by coupling a magnetic field to a permanent magnet mounted in the vicinity of the distal end of the stylus arm and normal to its longitudinal axis. The stylus arm compliant coupling generates a restoring force which, when the twisting force is released, reorients the stylus arm to a relaxed condition but in a lateral position substantially coincident with the translated center of mass.

SUMMARY OF THE INVENTION

The present invention is a stylus arm suspension formed in a generally flat, elongated configuration which is attached at one end to an inner surface of the cartridge enclosure so that it hangs suspended in a substantially vertical position. The suspension is made from a highly compliant material enabling its second end to move relatively freely and having sufficient resilience to restore itself to its orginal shape after being subjected to elastic deformation. A hole through the flat member near its second end receives the end of a stylus arm to be secured thereto. The width of the flat member is substantially uniform with the exception of a necked down region located between the hole and the first end. The width and the thickness of the member is designed to provide the desired compliance for longitudinal translations of the stylus arm. The width of the necked down region is designed to provide the desired rotational compliance for twisting the stylus arm and to provide restorative torque to the stylus arm. The first end of the member is provided with first and second expanded regions separated by a relatively short narrow region. The suspension is attached to the cartridge by compressing the endmost expanded region for passage through an aperture in the cartridge. Once through the aperture it is allowed to re-expand—the two expanded regions being in compression on opposite sides of the aperture for self retention of the suspension to the cartridge.

DETAILED DESCRIPTION

Figure 1:
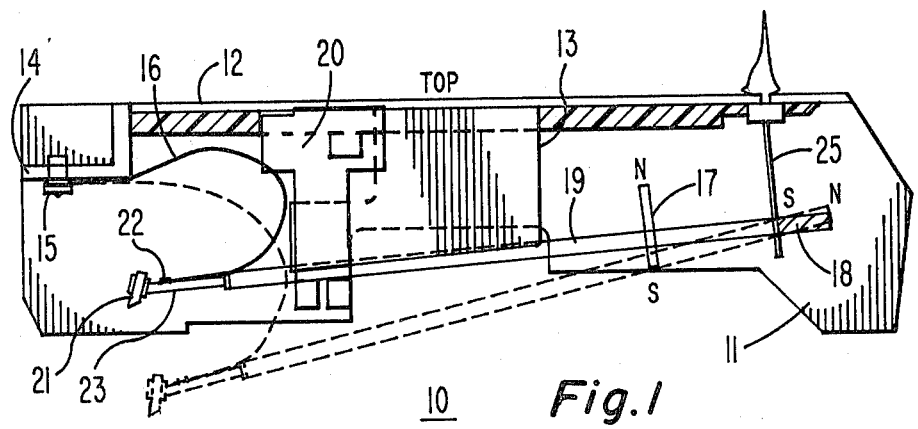
FIG. 1 is a cutaway view of a video disc player signal pickup cartridge.

Referring first to FIG. 1, there is shown an expanded, cutaway view of a signal pickup cartridge 10. The cartridge has sidewalls 11 (only one shown) and a top wall 12 rigidly holding the sidewalls in a spaced apart relationship. The bottom plane of the cartridge 10 is open. The top wall (12) and sidewalls 11 of the cartridge form an enclosure in which a signal pickup stylus 21 is supported.

The pickup stylus 21 is mounted to a stylus holder 23 (e.g., a molded plastic element) which is rigidly attached to the distal end of a longitudinal, lightweight stylus arm 19. The proximate end of the stylus arm 19 is suspended from the top surface 12 of the cartridge by a compliant suspension 25. A leaf spring 16, deformed in a compressive arc is connected between the distal end of the stylus arm 19, and a shelf 14 integral to the cartridge enclosure, and arranged to tend to expel the stylus through the bottom plane of the cartridge. The leaf spring 16 is secured to the shelf 14 by a metallic rivet 15. The leaf spring is typically electrically conductive and serves the dual functions of (a) providing the necessary stylus-disc interactive pressure when the cartridge is positioned for signal recovery, and (b) for providing electrical connection between the pickup stylus electrode and signal processing circuitry (not shown).

In the FIG. 1 configuration, at least the proximate end of the stylus arm is hollow for reception therein of a permanent magnet 18 having north and south poles aligned along the longitudinal axis of the stylus arm. Magnet 18 is designed to cooperate with an electromagnetic coil mounted in the player to provide longitudinal translations of the stylus arm for the purpose of performing stylus-disc velocity corrections, i.e., armstretching, during signal recovery.

A second, generally longitudinal permanent magnet 17 is fixed to the stylus arm 19 nearer its proximate end, Magnet 17 is mounted perpendicular to the stylus arm and arranged so that its longitudinal axis is substantially vertical i.e., substantially perpendicular to the cartridge top wall 12. The width of the magnet 17 is less than the diameter (width) of the stylus arm and is inserted in a hole punched therethrough. The north and south poles of magnet 17 lie along its vertical axis.

Magnet 17 is arranged to cooperate with a further electromagnetic coil (not shown) mounted in the player for the purpose of twisting the stylus arm to effect lateral translations of the stylus (see U.S. Pat. Nos. 4,183,059 and 4,258,233).

The cartridge assembly includes a retainer 20 for holding the stylus arm assembly in a retracted position within the confines of the cartridge enclosure when the cartridge is not in the player apparatus, e.g., during storage and handling. In the retracted position the stylus arm 19 rests against an inverted cradle 13 integrally molded into the cartridge body. The retainer 20 has a pair of resilient fingers 41 and 42 arranged to clamp around the stylus arm 19 holding it in the cradle structure 13. When the cartridge is secured in the player apparatus, the retainer fingers are spread apart releasing the stylus arm and permitting gravity and the leaf spring to pivot the distal end of the stylus arm downward. The approximate position or orientation of the stylus during signal recovery is indicated by the stylus arm shown in broken lines.

The design of the cartridge was predicated on several commercial and system restraints. These restraints include the use of a small armstretcher magnet (e.g., 18) affixed to the stylus arm and secondly, that lateral translation of the stylus be predictable for a fairly wide range of lateral stylus positions with respect to the centered or relaxed position of the stylus. More specifically, the system must be capable of accurately repositioning the stylus between one, two, etc. disc signal tracks for the stylus engaging any track within a range of for example 100 tracks either side of the track the stylus would engage on being set down on the record. To afford this flexibility, the leaf spring should present relatively uniform compliance to lateral movement over this range while maintaining the desired vertical or stylus-disc tracking pressure. In U.S. patent application Ser. No. 118,240 filed Feb. 4, 1980, Taylor disclosed a flylead (leaf spring) with necked down regions proximate its ends which tended to provide generally greater compliance to lateral stylus motion. In order to realize the desired vertical forces from this structure the flylead was required to depart the stylus holder at a particular angle, approximately 60 degrees with respect to the stylus arm axis. This necked down flylead proved to be successful for use in the commercially available cartridge but was costly to assemble and difficult to handle and therefore inappropriate for the present application.

It was found that the desired parameters for the present application could be achieved by mounting the ends of the leaf spring so that they respectively remained substantially parallel with the plane of the top wall 12 of the cartridge and the longitudinal axis of the stylus arm. This arrangement in conjunction with proper dimensioning of the leaf spring will produce an optimum configuration with respect to uniform lateral compliance and effective vertical resilience.

Lateral displacement of the stylus is performed by twisting the stylus arm relatively slowly in the direction of desired translation causing it to "wind up" on its mounts, and then abruptly releasing the stylus arm. The twisting tends to rock the center of mass of the stylus arm assembly about the point of stylus-disc engagement, translating the center of mass in the desired direction. When the twisting force is abruptly released, the restorative torque developed in the stylus arm mounts (suspension 25 and leaf spring 16) rotates the stylus arm about the center of mass causing a translation of the stylus tip in the desired direction.

Twisting is achieved by subjecting one pole of a permanent magnet (17) to a generally uniform magnetic field produced by selectively energized electromagnetic coils disposed on either side thereof. This mechanism is taught by U.S. Pat. No. 4,258,233 wherein the permanent magnet is affixed in the vicinity of the distal end of the stylus arm so that the coil produced magnetic field, in addition to twisting the stylus arm, produces some direct lateral force thereto by virtue of a net magnetic attraction or repulsion. The amplitude of the direct lateral forces depends on the relative position of the permanent magnet with respect to the coils. For the present application where accurate stylus positioning is to be performed over a relatively wide range of stylus positions, it was necessary to minimize the positional dependence of the direct forces. The influence of the direct lateral forces has been reduced in the present cartridge by locating the permanent magnet 17 nearer the proximate end of the stylus arm. Being nearer the pivot point, the magnet 17 does not undergo significant lateral translation and therefore the direct lateral forces will exhibit a lesser positional dependence. In addition, the effect of these direct forces on the stylus are significantly reduced by virtue of the magnet being on the shorter end of a lever arm.

It is desirable to tune the stylus arm assembly with respect to torsional resonances so that stylus translations may be performed with a minimum of applied energy and so that the twisting vibrations (oscillatory motion) will settle within a requisite period. It has been found that the vertical position of magnet 17 influences the torsional resonance of the stylus arm assembly. In particular, locating the magnet 17 so that 75 percent of its length is above and 25 percent of its length below the centerline of the stylus arm has provided desirable torsional stylus arm response.

The restorative twisting of the stylus arm is provided primarily by the design of the stylus arm suspension member 25. However, the suspension design features which permit the twist and restoration must comport with the suspension design requirements to permit acceptable armstretching (velocity correction). As mentioned before, armstretching is performed by an electromagnet producing a variable magnetic field which interacts with the permanent magnet 18 to generate longitudinal stylus arm motion. The inside diameter of one stylus arm chosen for this assemblage is 0.040 in. which only allows for a very small magnet to be seated therein. Small permanent magnets exhibit small magnetic fields making it impractical to generate significant forces by the interaction of these fields and an electromagnetic coil. Therefore in order to produce longitudinal motion in the stylus arm with such a magnet the stylus arm must be relatively free to move along its longitudinal axis. The freedom of axial movement is a function of the compliance of the stylus arm suspension 25. And finally, since the distal end of the stylus arm is attached to the cartridge by an energy storing element, i.e., the leaf spring, the suspension 25 must be capable of providing some damping effect to axial stylus arm motion.

Figure 2:
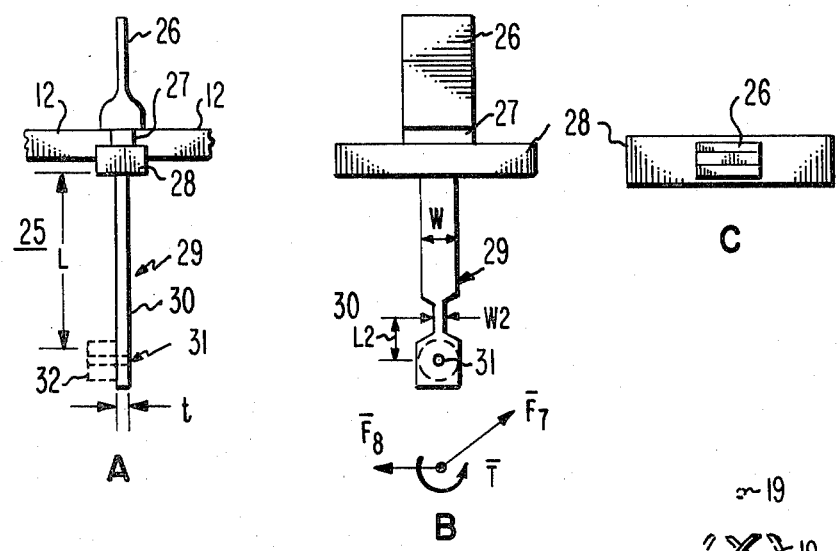
FIGS. 2A, 2B and 2C are side, front and top views of a compliant stylus arm suspension member.

The physical features of the suspension 25 are illustrated in FIGS. 2A, 2B and 2C. FIG. 2A is a side view of the suspension as it is seen in the FIG. 1 cartridge. The suspension is formed of a compliant elastomer having a generally long, flat body which is thin compared to its width. There are two expanded sections 26 and 28 to the suspension separated by a short section 27 for mounting it to the cartridge top wall 12. To attach the suspension 25 to the cartridge, the section 26 is squeezed or compressed to pass through the hold 12' located in the cartridge top wall 12. The suspension is pushed or pulled through the hole until the section 28 abuts the top wall 12 and the section 26 has cleared the hole. The short section 27 between the expanded sections is shorter than the length of the hole 12' so that when section 26 is released and allowed to re-expand onto the opposite surface of top wall 12, section 27 will be in tension. Sections 26 and 28 will thus firmly hold the suspension to the cartridge by compressive forces.

The expanded section 28 is configured to be accepted in a conformal recess in the top wall 12, thus is also serves to properly position the suspension in the cartridge. When the cartridge assembly 10 is mounted in the player, it is placed in a conformal cavity in an arm carriage and the expanded section 26 provides a convenient handle for removing the cartridge from the carriage for servicing.

The body 29 of the suspension is long and flat and hangs substantially vertically from the top of the cartridge surface 12. There is a hole 31 a distance L from section 28 to receive the stylus arm. The hole 31 may be smaller than the outer dimension of the stylus arm to hold it therein by compression, or, if desired, the stylus arm may be secured by an adhesive. A collar 32, shown in broken lines, may be added to preclude the stylus arm from excessively distorting the suspension at the mounting hole 31, or for providing means to more securely attach the stylus arm to the suspension. The length L, width W and thickness t and hardness are dimensioned to afford the desired compliance in the direction normal to the flat surface. One particular example of suspension dimensions for a cartridge having a 1.65 inch long stylus arm made from 0.045 inch outer diameter thin wall aluminum tubing are; length L of 0.30 inch, width W of 0.12 inch and thickness t of 0.015 for a suspension composition of butyl rubber of hardness 30 durometer Shore "A".

It was found that a suspension having uniform length, width and thickness would not simultaneously provide both the desired longitudinal compliances for armstretching and the torsional compliance for lateral stylus translations, i.e., twisting. The desired torsional compliance is achieved by reducing the width of the body 29 over a relatively short area 30, located a relatively short distance L2 from the hole 31 without substantially affecting the longitudinal compliance of the system. Note (FIG. 1) that the orientation of the stylus arm is established by the stylus resting on the disc and its proximate end being suspended via the suspension 25. The armstretching forces are provided in the direction axial to the hole 31 and along the stylus arm. For the narrowed area 30 to affect longitudinal compliance, the stylus arm must be disposed to bend or pivot about that area of the suspension, but the orientation of the stylus arm and the direction of the armstretcher forces preclude such bending and thus the effect of the narrowed area 30 to longitudinal compliance is not significant. The width of the narrowed region 30 in the foregoing example is 0.020 inch over a length of approximately 0.030 inch and is located approximately 0.22 inch from the expanded section 28.

Consider the imposition of a magnetic field to the permanent magnet 17 to impart a counter clockwise twisting to the stylus arm. The attractive (repulsive)

forces on magnet 17 will create a direct force $F_D$ to the stylus arm tending to cause some lateral (sideways) motion (see the force diagram in FIG. 2B). The reaction of the suspension to the twisting torque will create an effective force $E_T$ directed upwardly and laterally opposite the direction imparted by the direct force $F_D$. The lateral components of force will tend to cancel, minimizing lateral translation of the proximate end of the stylus arm. The narrowed section 30 will permit the suspension to bend about an axis parallel to the axis of the hole. A counter clockwise stylus arm twist will produce tension and compression in the left and right sides of the narrowed section 30 and a general elevation of the proximate end of the stylus arm. The tension and compression produced in the suspension produce a restoring force to twist the stylus arm back to its equilibrium position when the magnetic twisting force is removed. In addition, the force of gravity tending to re-lower the proximate end of the stylus arm from its elevated position aids the restorative torque produced by the suspension.

It will be noted at this point that the grommet-like configuration for attaching the suspension to the cartridge not only facilitates cartridge assembly, but also has the positive effect of not influencing the mechanical parameters of the suspending body 29 because the main suspension body hangs freely. The resonant frequencies of the body 29 are thus substantially unaffected by the mount.

Figure 3:
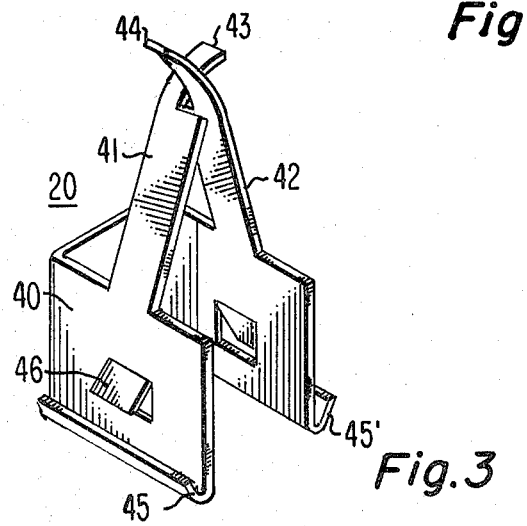
FIG. 3 is a perspective view of a stylus arm retainer included in the FIG. 1 cartridge.
Figure 4:
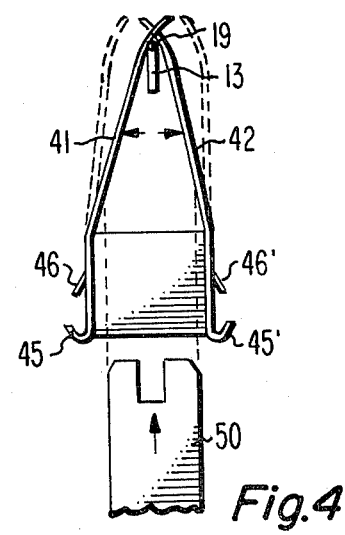
FIG. 4 is a diagrammatic representation of the method by which the FIG. 3 retainer releases the stylus arm.

The stylus arm retainer will next be described with reference to FIGS. 3 and 4. The retainer 20 is an element formed from a contiguous sheet of resilient material, e.g., 0.006 inch thick phosphor bronze spring stock with grade c spring temper, selectively shaped and bent to the desired configuration. The retainer has a three-sided body 40 having finger-like members 41 and 42 extending from opposite sides of the body. The fingers are angled inward to converge on each other at a point distant from the body 40 and in a plane substantially midway between the opposing sidewalls. The bottommost extremeties of the opposing sides of the body are bent outward and upward to form tabs or flanges 45 and 45'. A three-sided cut is made in each sidewall disposed above the flanges 45 and 45' and the material circumscribed by the cuts is pushed outward to form clip fasteners or tabs 46 and 46'. When the retainer 40 is inserted in the cartridge 10 the flanges 45(45') and the clip fasteners 46(46') are disposed compressively on opposite surfaces of top wall 12 for securely holding the retainer 20 to the cartridge.

The ends of the fingers 41 and 42 are reduced to one-half their width by cutting a rectangular piece from each so that the remaining portions 43 and 44 criss-cross and can come to rest, when unimpeded, on a shelf of the opposite finger created by the cut. The ends of the fingers 43 and 45 are arced slightly inward.

The retainer 20 is inserted in the cartridge through a conformal hole in the top wall 12 with the fingers arranged on their respective sides of the cradle support 13. The fingers 41 and 42 are bent at the sides of the body 40 so that they engage the cradle in compression with the tips 43 and 44 encircling the stylus arm when it is in the retracted position. The stylus arm is released from the fingers by inserting a rigid generally rectangular tongue 50 between them (as indicated in phantom by the broken lines in FIG. 4). The tongue 50 is fixed to a cover (not shown) which closes over the cartridge when it is placed in the player. The stylus arm is removed from the cradle by the force of gravity and the spring force of the leaf spring when the fingers are spread outward.

What is claimed is:

1. A structure for suspending a stylus arm in a cartridge enclosure comprising:
    a contiguous element formed from compliant material having a flat rectangular member, said member being relatively long compared to its width and relatively wide compared to its thickness and having an aperture in the vicinity of a first end thereof for receiving said stylus arm, said member having a section of narrowed width located near said aperture between the first end and a second end;
    first and second expanded regions separated by a section, the second expanded region being contiguous with the second end of said flat rectangular member, and wherein the element is affixed to said cartridge by compressing the first expanded region to permit passage thereof through a hole in said cartridge enclosure, thereafter allowing said first expanded region to re-expand, the first and second expanded regions residing on either side of the hole in the cartridge body in a compressive state.

2. The structure set forth in claim 1 further including a further region of expanded material contiguous with the rectangular member and circumscribing said aperture therein for strengthening the element at the point of connection with the stylus arm.

3. The structure set forth in claim 1 or 2 wherein said second expanded region is a generally flat rectangle with the flat surface being perpendicular to the longitudinal axis of said member, said second expanded region being designed conformal with a recess in the cartridge for establishing the orientation of the element.

4. The structure set forth in claim 1 or 2 wherein the compliant material is butyl rubber.

5. The structure set forth in claim 1 or 2 wherein the first expanded region is relatively long compared to its width with its long axis parallel with the long axis of said member, said elongated first expanded region serving as a handle for picking up said cartridge.

6. The structure set forth in claim 1 or 2 wherein said member is substantially 0.30 inches long from its second end to the center of said aperture, 0.12 inches wide, 0.015 inches thick and has a narrowed region 0.020 inches wide.

7. An element for suspending a stylus arm in a cartridge enclosure comprising a relatively thin, flat rectangular member which is relatively long compared to its width, having a hole in the vicinity of a distal end for receiving said stylus arm, having an expanded region at a proximate end, said element being designed to hang vertically from a horizontal top wall of the cartridge, a portion of said element being positioned vertically through an aperture in said top wall such that said expanded region contacts the under surface of the top wall and restrains said element from further movement through the aperture, and wherein said element is formed from a compliant material to afford bending of the element about an axis parallel with a minor axis of the rectangle and twisting about an axis normal to the flat surface.

8. A video disc pickup cartridge for supporting a signal pickup stylus comprising:
    first and second sidewalls spaced apart by a topwall to form a generally rectangular enclosure with its long sides defined by said sidewalls;

a tubular stylus arm having said pickup stylus secured to a first end, and having a second end;

a generally long, narrow, flat suspension made of compliant material secured at a first end thereof only to said cartridge top wall, said suspension hanging therefrom within the confines of said enclosure;

means for securing the second end of said stylus arm to a second end of said suspension;

a longitudinal permanent magnet having poles along its longitudinal axis, said magnet being of substantially uniform width and thickness and wherein said magnet is mounted to the stylus arm nearer its second than its first end and generally perpendicularly disposed in a plane formed by the intersection of the stylus arm and the long axis of said suspension, and wherein the mass of the magnet is proportioned about the center of the stylus arm to effect torsional tuning thereof.

9. The cartridge set forth in claim 8 wherein said permanent magnet is mounted with 75 percent of its bulk located on the top wall of the stylus arm centerline and 25 percent of its bulk on the opposite side of said centerline.

10. The cartridge set forth in claim 8 or 9 further including a second longitudinal permanent magnet, said second magnet being inserted coaxially inside the tubular stylus arm and secured therein at its second end.

11. The cartridge set forth in claim 10 wherein said suspension has a region of narrowed width located proximate the second end and between said first and second ends, said narrowed region providing torsional compliance with respect to a twisting of said stylus arm about its long axis.

* * * * *